United States Patent
Matsumura et al.

(10) Patent No.: US 9,237,507 B2
(45) Date of Patent: Jan. 12, 2016

(54) RADIO COMMUNICATION SYSTEM AND COMMUNICATION CONTROL METHOD

(75) Inventors: Takashi Matsumura, Tokyo (JP); Takanori Miura, Tokyo (JP); Susumu Kashiwase, Tokyo (JP); Hitoya Tachikawa, Kanagawa (JP)

(73) Assignee: KYOCERA Corporation, Kyoto (JP)

(*) Notice: Subject to any disclaimer, the term of this patent is extended or adjusted under 35 U.S.C. 154(b) by 115 days.

(21) Appl. No.: 14/119,389

(22) PCT Filed: May 24, 2012

(86) PCT No.: PCT/JP2012/063330
§ 371 (c)(1),
(2), (4) Date: Dec. 5, 2013

(87) PCT Pub. No.: WO2012/161254
PCT Pub. Date: Nov. 29, 2012

(65) Prior Publication Data
US 2014/0098738 A1    Apr. 10, 2014

(30) Foreign Application Priority Data
May 24, 2011 (JP) .................. 2011-116275

(51) Int. Cl.
| | |
|---|---|
| *H04W 40/12* | (2009.01) |
| *H04W 84/04* | (2009.01) |
| *H04W 16/24* | (2009.01) |
| *H04W 72/12* | (2009.01) |
| *H04W 88/08* | (2009.01) |
| *H04W 48/20* | (2009.01) |
| *H04B 7/26* | (2006.01) |
| *H04B 7/06* | (2006.01) |

(Continued)

(52) U.S. Cl.
CPC .............. *H04W 40/12* (2013.01); *H04W 16/24* (2013.01); *H04W 48/20* (2013.01); *H04W 72/1231* (2013.01); *H04W 84/047* (2013.01); *H04W 88/085* (2013.01); *H04B 7/0673* (2013.01); *H04B 7/155* (2013.01); *H04B 7/2606* (2013.01); *H04W 16/26* (2013.01); *H04W 84/005* (2013.01); *H04W 88/04* (2013.01)

(58) Field of Classification Search
CPC ..... H04W 40/12; H04W 48/20; H04W 16/26; H04W 88/04; H04W 84/005
USPC ......................................... 370/315
See application file for complete search history.

(56) References Cited

U.S. PATENT DOCUMENTS

| | | | |
|---|---|---|---|
| 2005/0181792 A1 | 8/2005 | Kobayashi et al. | |
| 2006/0270341 A1* | 11/2006 | Kim ................. | H04B 7/2606 455/16 |

(Continued)

FOREIGN PATENT DOCUMENTS

| | | |
|---|---|---|
| JP | 2004-153802 A | 5/2004 |
| JP | 2007-274541 A | 10/2007 |
| JP | 2009-225125 A | 10/2009 |

OTHER PUBLICATIONS

International Search Report; PCT/JP2012/06330; Jun. 19, 2012.

*Primary Examiner* — Jae Y Lee
*Assistant Examiner* — Jean F Voltaire
(74) *Attorney, Agent, or Firm* — Studebaker & Brackett PC (57) ABSTRACT

A radio communication system comprises: a radio base station, a terminal device, and a plurality of relay devices that relay radio communication between the radio base station and the terminal device. The plurality of relay devices create communication quality information in radio communication between the relay devices and the radio base station. The terminal device preferentially connects to the relay device having the best communication quality based on each of the communication quality information.

4 Claims, 6 Drawing Sheets

(51) Int. Cl.
*H04B 7/155* (2006.01)
*H04W 16/26* (2009.01)
*H04W 84/00* (2009.01)
*H04W 88/04* (2009.01)

(56) References Cited

U.S. PATENT DOCUMENTS

2007/0280292 A1* 12/2007 Lee .................. H04L 5/0032 370/468

2008/0039013 A1* 2/2008 Chang .................. H04B 7/155 455/11.1
2008/0232296 A1* 9/2008 Shin .................. H04B 7/2606 370/315
2012/0238311 A1* 9/2012 Takahashi ........... H04W 52/243 455/522
2013/0058220 A1* 3/2013 Yi .................. H04W 72/1284 370/241

* cited by examiner

| LOCATION INFORMATION | | COMMUNICATION QUALITY INFORMATION | | ACCESS INFORMATION | | |
|---|---|---|---|---|---|---|
| LATITUDE | LONGITUDE | RECEIVED FIELD STRENGTH | RECEIVED QUALITY | ESSID | AUTHENTICATION SCHEME | AUTHENTICATION KEY |
| 35.xxxxxx | 139.yyyyyy | -98dBm | -17dB | MR-1234 | WPA-PSK/AES | Abcd9876XYZ |

FIG. 7

| MR NUMBER | COMMUNICATION QUALITY INFORMATION | | ACCESS INFORMATION | | |
|---|---|---|---|---|---|
| | RECEIVED FIELD STRENGTH | RECEIVED QUALITY | ESSID | AUTHENTICATION SCHEME | AUTHENTICATION KEY |
| 2 | -85dBm | -12dB | WMAP5678-11G | WEP | 1234567890 |
| 1 | -98dBm | -17dB | MR-1234 | WPA-PSK/AES | Abcd9876XYZ |

FIG. 8

RADIO COMMUNICATION SYSTEM AND COMMUNICATION CONTROL METHOD

TECHNICAL FIELD

The present invention relates to a radio communication system including a radio base station, a terminal device, a plurality of relay devices that relay radio communication between the radio base station and the terminal device, and an upper node, and relates also to a communication control method in the radio base station.

BACKGROUND ART

A mobile router (MR) (see Patent Literature 1, for example) relays radio communication between the radio base station and the terminal device. Specifically, the mobile router functions as an access point of a radio LAN scheme for the terminal device, and functions as a radio terminal for the radio base station. The mobile router normally is in one-to-one correspondence with the terminal device. For example, even if passengers in a bus respectively carry mobile routers, that is, if a large number of mobile routers exist in a bus, the terminal device carried by a passenger is capable of connecting only to a mobile user carried by the passenger.

As described above, as the mobile router is in one-to-one correspondence with the terminal device, the terminal device is not capable of selecting one mobile router in a good communication state with the radio base station, even if the plurality of mobile routers exist around the terminal device. Furthermore, the plurality of mobile routers respectively perform radio communication with the radio base station, so that the mobile routers scramble for a radio resource between the mobile routers and the radio base station. Therefore, there has been a case where the terminal device connecting to a part of the mobile routers is not capable of performing radio communication with the radio base station, so that it has not always been possible to efficiently perform radio communication.

PRIOR ART DOCUMENT

Patent Document

[Patent Document 1]: Japanese Unexamined Patent Application Publication No. 2004-153802

SUMMARY OF THE INVENTION

An aspect of a radio communication system according to the present invention is summarized as a radio communication system comprising: a radio base station, a terminal device, and a plurality of relay devices that relay radio communication between the radio base station and the terminal device, wherein the plurality of relay devices create communication quality information in radio communication between the relay devices and the radio base station, and the terminal device preferentially connects to the relay device having the best communication quality based on each of the communication quality information.

The other aspect of a radio communication system according to the present invention is summarized as the radio communication system, in the above aspect, comprising: an upper node, wherein the plurality of relay devices notifies the upper node of the communication quality information in radio communication between the relay devices and the radio base station, the upper node notifies the terminal device of the communication quality information, and the terminal device preferentially connects to the relay device having the best communication quality based on each of the communication quality information.

The other aspect of a radio communication system according to the present invention is summarized as the radio communication system, in the above aspect, wherein the upper node notifies the terminal device of order information that is information obtained by ordering the plurality of relay devices on the basis of the communication quality information, and the terminal device preferentially connects to the relay device at the highest order indicated by the order information.

The other aspect of a radio communication system according to the present invention is summarized as the radio communication system, in the above aspect, wherein the upper node distinguishes the plurality of relay devices existing within the predetermined range on the basis of location information of the plurality of relay devices, and notifies the terminal device of the order information that is the information obtained by ordering, on the basis of the communication quality information, the plurality of relay devices existing within the predetermined range, and the terminal device preferentially connects to the relay device at the highest order indicated by the order information.

An aspect of a communication control method according to the present invention is summarized as a communication control method in the radio communication system including: a radio base station, a terminal device, and a plurality of relay devices that relay radio communication between the radio base station and the terminal device, the method comprising: a step of creating, by the plurality of relay devices, communication quality information in radio communication between the relay devices and the radio base station, and a step of preferentially connecting, by the terminal device, to the relay device having the best communication quality based on each of the communication quality information.

DESCRIPTION OF THE EMBODIMENT

Next, an embodiment of the present invention will be described with reference to the drawings. Specifically, (1)

Configuration of radio communication system, (2) Operation of radio communication system, and (3) Other embodiments will be described. In all drawings for explaining the following embodiments, the same or similar reference numerals are used to designate the same or similar elements.

(1) Configuration of Radio Communication System

Figure 1:
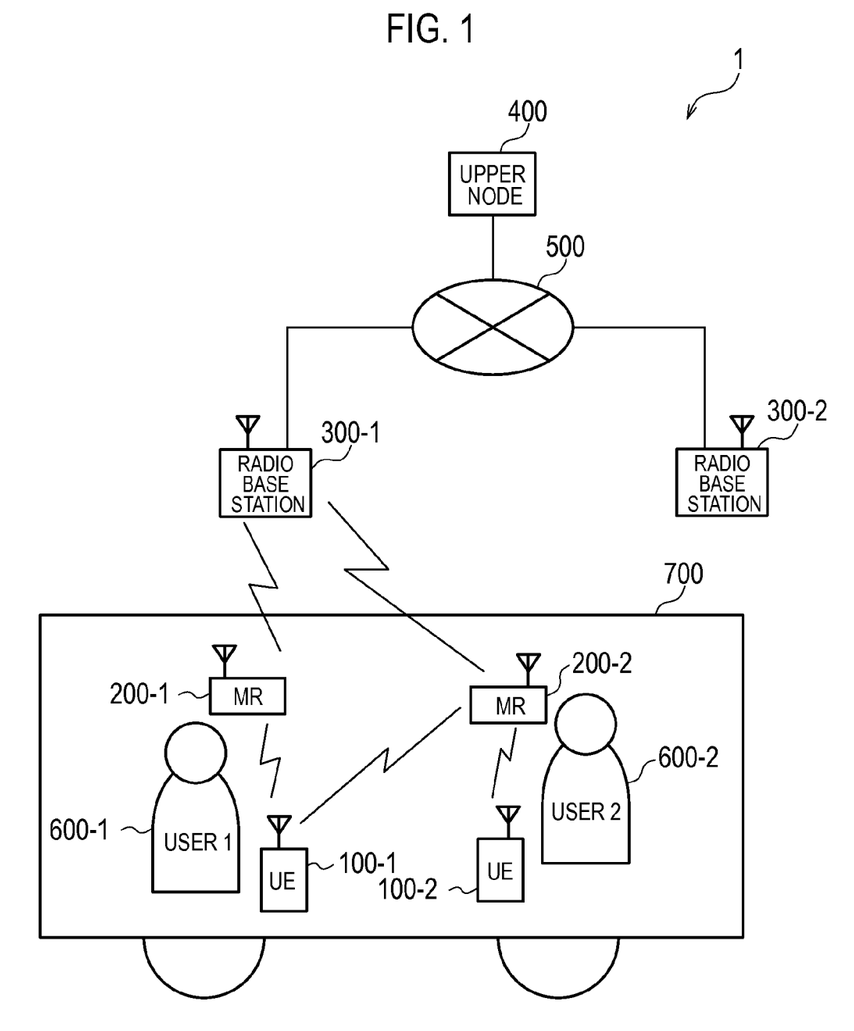
FIG. 1 is a diagram illustrating the entire schematic configuration of a radio communication system according to an embodiment of the present invention.

FIG. 1 is a diagram illustrating the entire schematic configuration of a radio communication system 1 according to an embodiment of the present invention. The radio communication system 1 includes a terminal device (UE) 100-1 and a mobile router (MR) 200-1 carried by a user 600-1 who is a passenger in a bus 700, a terminal device (UE) 100-2 and a mobile router (MR) 200-2 carried by a user 600-2 who is a passenger in the bus 700, a radio base station 300-1 and a radio base station 300-2, an upper node (for example, MME (Mobility Management Entity)) 400, and a core network 500.

Radio communication between the UE 100-1 and UE 100-2, and the MR 200-1 and MR 200-2 is performed by the radio LAN scheme. Radio communication between the MR 200-1, MR 200-2, UE 100-1, and UE 100-2, and the radio base station 300-1 and radio base station 300-2 is performed by a public radio communication scheme such as LTE (Long Term Evolution), EV-DO, HSPA (High Speed Packet Access), and WiMAX (Worldwide Interoperability for Microwave Access).

Figure 2:
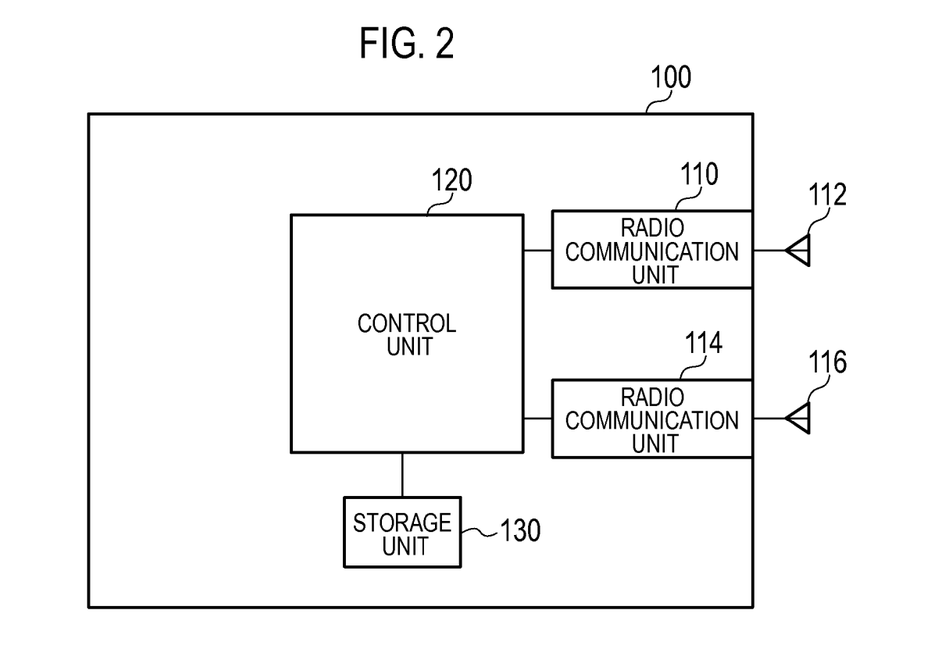
FIG. 2 is a diagram illustrating the configuration of a terminal device according to the embodiment of the present invention.

FIG. 2 is a diagram illustrating the configuration of the UE 100-1 and UE 100-2 (hereinafter, the UE 100-1 and UE 100-2 are collectively called "UE 100" as needed). As illustrated in FIG. 2, the UE 100 includes a radio communication unit 110, an antenna 112, a radio communication unit 114, an antenna 116, a control unit 120, and a storage unit 130.

The radio communication unit 110 is configured by using a radio frequency (RF) circuit or a baseband (BB) circuit, for example. The radio communication unit 110 is capable of performing radio communication, via the antenna 112, with the MR 200-1 and MR 200-2 (hereinafter, the MR 200-1 and MR 200-2 are collectively called "MR 200" as needed) by the radio LAN scheme.

The radio communication unit 114 is configured by using an RF circuit or a BB circuit, for example. The radio communication unit 114 is capable of performing radio communication, via the antenna 116, with the radio base station 300-1 and radio base station 300-2 (hereinafter, the radio base station 300-1 and radio base station 300-2 are collectively called a "radio base station 300" as needed) by the public radio communication scheme.

The control unit 120 is configured by using a CPU (Central Processing Unit) or a DSP (Digital Signal Processor), for example. The control unit 120 controls various functions provided in the UE 100. The storage unit 130 is configured by using a memory, for example, and stores various items of information used for, for example, controlling the UE 100.

Figure 3:
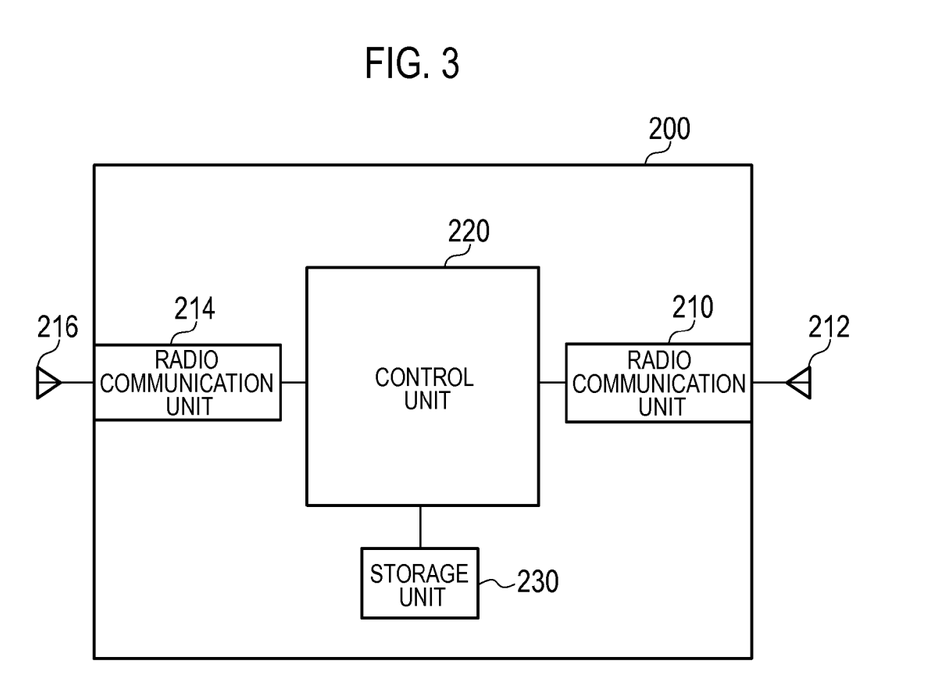
FIG. 3 is a diagram illustrating the configuration of a mobile router according to the embodiment of the present invention.

FIG. 3 is a diagram illustrating the configuration of the MR 200. As illustrated in FIG. 3, the MR 200 includes a radio communication unit 210, an antenna 212, a radio communication unit 214, an antenna 216, a control unit 220, and a storage unit 230.

The radio communication unit 210 is configured by using an RF circuit or a BB circuit, for example. The radio communication unit 210 is capable of performing radio communication, via the antenna 212, with the UE 100 by the radio LAN scheme.

The radio communication unit 214 is configured by using an RF circuit or a BB circuit, for example. The radio communication unit 214 is capable of performing radio communication, via the antenna 216, with the radio base station 300 by the public radio communication scheme.

The control unit 220 is configured by using a CPU or a DSP, for example. The control unit 220 controls various functions provided in the MR 200. The storage unit 230 is configured by using a memory, for example, and stores various items of information used for controlling the MR 200, for example.

Figure 4:
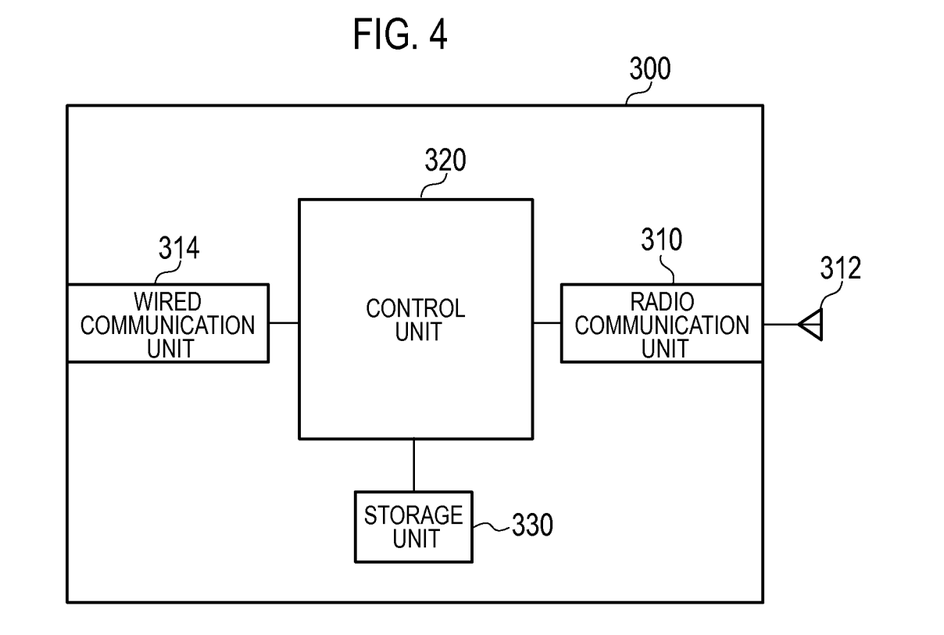
FIG. 4 is a diagram illustrating the configuration of a radio base station according to the embodiment of the present invention.

FIG. 4 is a diagram illustrating the configuration of the radio base station 300. As illustrated in FIG. 4, the radio base station 300 includes a radio communication unit 310, an antenna 312, a wired communication unit 314, a control unit 320, and a storage unit 330.

The radio communication unit 310 is configured by using an RF circuit or a BB circuit, for example The radio communication unit 310 is capable of performing radio communication, via the antenna 312, with the MR 200 or the UE 100 by the public radio communication scheme.

The wired communication unit 314 performs communication, via the core network 500, with the upper node 400 or another radio base station 300. When the LTE is adopted as the public radio communication scheme, an S1 interface that is a logical communication path is established between the radio base station 300 and the upper node 400, and an X2 interface that is a logical communication path is established between the radio base station 300 and the other radio base station 300.

The control unit 320 is configured by using a CPU or a DSP, for example. The control unit 320 controls various functions provided in the radio base station 300. The storage unit 330 is configured by using a memory, for example, and stores various items of information used, for example, for controlling the radio base station 300.

Figure 5:
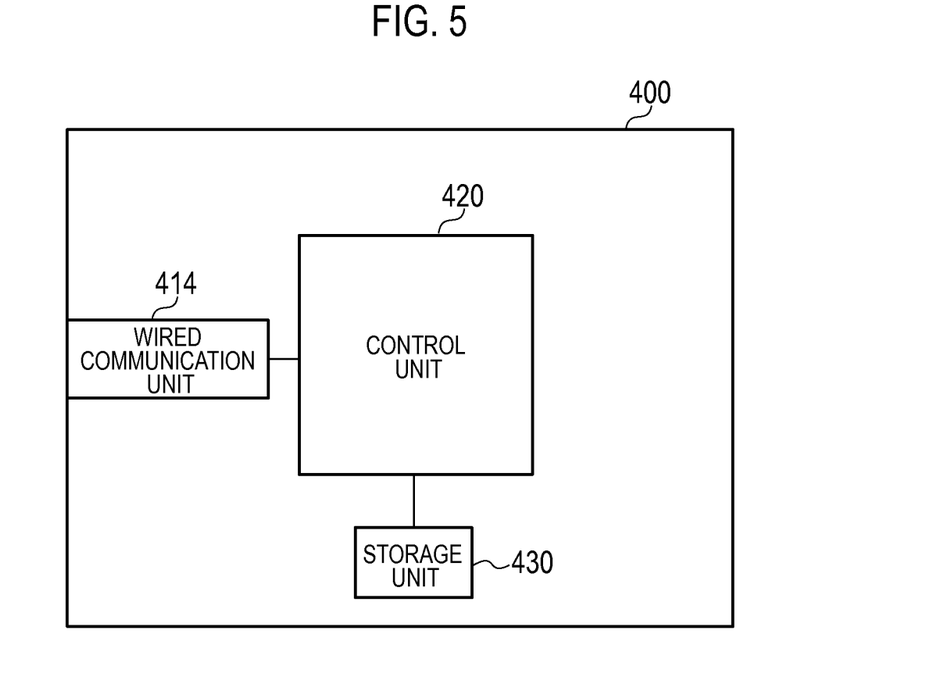
FIG. 5 is a diagram illustrating the configuration of an upper node according to the embodiment of the present invention.

FIG. 5 is a diagram illustrating the configuration of the upper node 400. As illustrated in FIG. 5, the upper node 400 includes a wired communication unit 414, a control unit 420, and a storage unit 430.

The wired communication unit 414 performs communication, via the core network 500, with the radio base station 300.

The control unit 420 is configured by using a CPU or a DSP, for example. The control unit 420 controls various functions provided in the upper node 400. The storage unit 430 is configured by using a memory, for example, and stores various items of information used for controlling the upper node 400, for example.

Next, a detailed process of the radio communication system 1 will be described.

The control unit 120 in the UE 100-1 carried by the user 600-1 performs a call connection process with the control unit 220 in the MR 200-1 carried by the user 600-1, in response to an operation, by the user 600-1, of an operation unit not illustrated. In the call connection process, the control unit 120 in the UE 100-1 recognizes ESSID (Extended Service Set Identifier) corresponding to the MR 200-1. Furthermore, the control unit 120 in the UE 100-1 reads out an authentication key for connecting to the MR 200-1 from the storage unit 130, and transmits the authentication key to the MR 200-1. On receiving the authentication key, the control unit 220 in the MR 200-1 performs authentication based on the authentication key and permits a connection of the UE 100-1. Accordingly, it becomes possible to perform radio communication by the radio LAN scheme between the UE 100-1 and the MR 200-1.

A radio base station (herein, the radio base station 300-1 and radio base station 300-2) around the MR 200-1 transmits a broadcast signal and the like. The control unit 220 in the MR 200-1 receives the broadcast signal and the like from the radio base station 300-1 and radio base station 300-2. The control unit 220 in the MR 200-1 measures communication quality, such as received field strength (RSSI: Reserved Signal Strength Indication) and received quality (SINR: Signal to Noise Interference Ratio) of each broadcast signal and the like. The control unit 220 in the MR 200-1 performs a call connection process with a radio base station (herein, the radio base station 300-1) having good communication quality. Accordingly, it becomes possible to perform radio communication by the public radio communication scheme between the MR 200-1 and the radio base station 300-1.

A call connection process between the UE 100-1 and the MR 200-1 and a call connection process between the MR 200-1 and the radio base station 300-1 allow the MR 200-1 to relay radio communication between the UE 100-1 and the radio base station 300-1.

Similarly, a call connection process between the UE 100-2 and the MR 200-2 and a call connection process between the MR 200-2 and the radio base station 300-1 are performed. Accordingly, the MR 200-2 is capable of relaying radio communication between the UE 100-2 and the radio base station 300-1.

The control unit 220 in the MR 200-1 acquires a location (latitude and longitude) of the MR 200-1 by using a function such as GPS (Global Positioning System). The control unit 220 in the MR 200-1 measures communication quality, such as received field strength and received quality (SINR: Signal to Noise Interference Ratio) of a signal from the radio base station 300-1 that is a connection destination.

Figure 6:
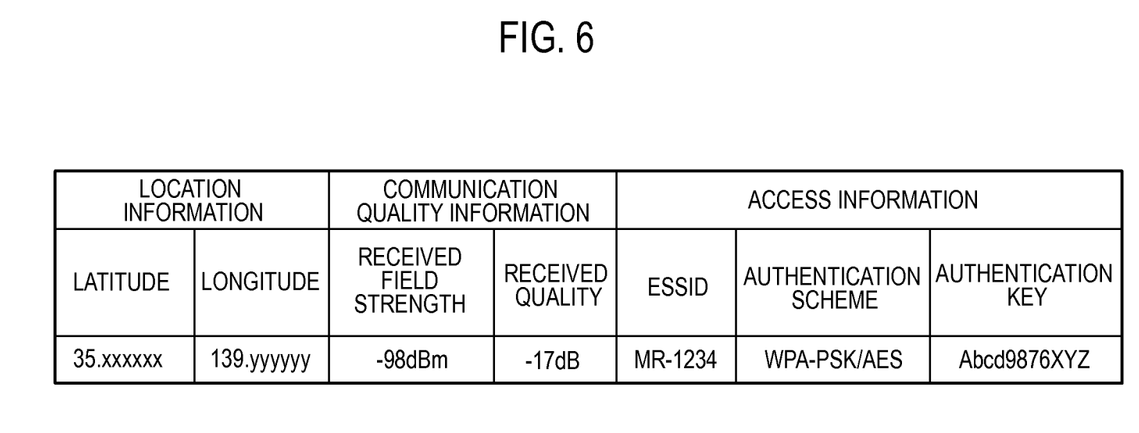
FIG. 6 is a diagram illustrating an example of location information, communication quality information, and access information according to the embodiment of the present invention.

Next, the control unit 220 in the MR 200-1 transmits location information, communication quality information, and access information of the MR 200-1 to the upper node 400 in a predetermined cycle, via the radio base station 300-1. FIG. 6 is a diagram illustrating an example of the transmitted information. The access information is information required when the UE connects to the MR 200-1, and includes ESSID, an authentication scheme, and an authentication key. The predetermined cycle is a variation value in inverse proportion to a fixed value, such as 5.12 seconds and 30 seconds, or to a movement speed of the bus 700, that is, a movement speed of the MR 200-1.

Similarly, the control unit 220 in the MR 200-2 acquires a location (latitude and longitude) of the MR 200-2. The control unit 220 in the MR 200-2 measures communication quality, such as received field strength and received quality of a signal from the radio base station 300-1 that is a connection destination.

Next, the control unit 220 in the MR 200-2 transmits an MR number, the location information, the communication quality information, and the access information of the MR 200-2 to the upper node 400 in a predetermined cycle, via the radio base station 300-1. The access information is information required when the UE connects to the MR 200-2, and includes ESSID, an authentication scheme, and an authentication key.

The control unit 420 in the upper node 400 receives the location information, the communication quality information, and the access information from the MR 200-1, and receives the location information, the communication quality information, and the access information from the MR 200-2.

The control unit 420 in the upper node 400 generates adjacent MR list information that is information on another MR adjacent to the MR 200-1. Specifically, the control unit 420 in the upper node 400 compares the location information from the MR 200-1 and the location information from the other MRs, and distinguishes another MR existing within a predetermined range from the MR 200-1. Furthermore, the control unit 420 in the upper node 400 compares a movement speed of the MR 200-1 based on a change of the location information from the MR 200-1 and a movement speed of another MR based on a change of the location information from the other MR, and distinguishes the other MR moving in the same way as MR 200-1, in other words, the other MR expected to exist in the bus 700.

Figure 7:
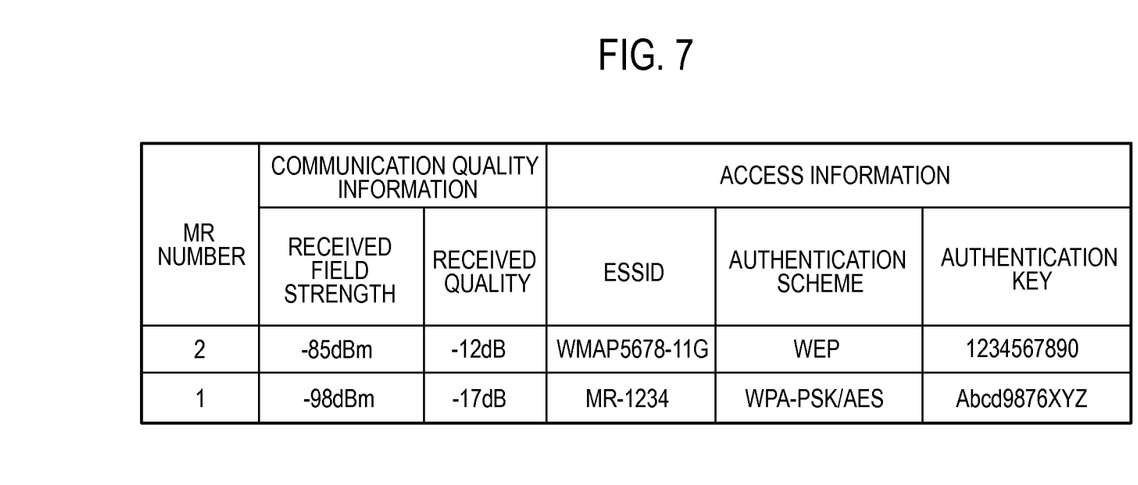
FIG. 7 is a diagram illustrating an example of adjacent MR list information according to the embodiment of the present invention.

Next, the control unit 420 in the upper node 400 distinguishes another MR (herein, the MR 200-2) existing within a predetermined range from the MR 200-1 and existing in the bus 700. Furthermore, the control unit 420 in the upper node 400 generates adjacent MR list information (adjacent MR list information of the MR 200-1) in which the communication quality information and the access information of the MR 200-1 and the communication quality information and the access information of the distinguished MR 200-2 are arranged in descending order of communication quality indicated by the communication quality information. FIG. 7 is a diagram illustrating an example of the adjacent MR list information. The control unit 420 in the upper node 400 transmits the adjacent MR list information of the MR 200-1 to the MR 200-1, via the radio base station 300-1. The control unit 220 in the MR 200-1 receives the adjacent MR list information of the MR 200-1.

Similarly, the control unit 420 in the upper node 400 compares the location information from the MR 200-2 and the location information from the other MR, and distinguishes the other MR existing within a predetermined range from the MR 200-2. Furthermore, the control unit 420 in the upper node 400 compares a movement speed of the MR 200-2 based on a change of the location information from the MR 200-2 and a movement speed of the other MR based on a change of the location information from the other MR, and distinguishes the other MR moving in the same way as the MR 200-2, in other words, the other MR expected to exist in the bus 700.

Next, the control unit 420 in the upper node 400 distinguishes another MR (herein, the MR 200-1) existing within a predetermined range from the MR 200-2 and existing in the bus 700. Furthermore, the control unit 420 in the upper node 400 generates adjacent MR list information (adjacent MR list information of the MR 200-2) in which the communication quality information and the access information of the MR 200-2 and the communication quality information and the access information of the distinguished MR 200-1 are arranged in descending order of communication quality indicated by the communication quality information. The control unit 420 in the upper node 400 transmits the adjacent MR list information of the MR 200-2 to the MR 200-2, via the radio base station 300-1. The control unit 220 in the MR 200-2 receives the adjacent MR list information of the MR 200-2.

The control unit 120 in the UE 100-1 transmits information for requesting the adjacent MR list information of the MR 200-1 (adjacent MR list request information) to the MR 200-1 at a predetermined timing, for example, when a value of communication quality (such as SINR) between the UE 100-1 and the MR 200-1 becomes equal to or less than a predetermined value.

The control unit 220 in the MR 200-1 receives the adjacent MR list request information from the UE 100-1. Next, the control unit 220 in the MR 200-1 transmits the adjacent MR list information of the MR 200-1 to the UE 100-1 in response to the request.

The control unit 120 in the UE 100-1 receives the adjacent MR list information of the MR 200-1. Next, the control unit 120 in the UE 100-1 determines a candidate MR to which handover is made (candidate handover destination) on the basis of the adjacent MR list information of the MR 200-1. Specifically, the control unit 120 in the UE 100-1 selects the candidate MR to which handover is made in the order that information items of the adjacent MRs of the MR 200-1 are arranged in the adjacent MR list information, in other words, in descending order of communication quality. In addition, in the adjacent MR list information of the MR 200-1, when the information of the MR 200-1 is arranged at the highest order, that is, when the MR 200-1 has the best communication quality, it is not necessary to perform a handover. Therefore, the control unit 120 in the UE 100-1 completes a series of processes.

The control unit 120 in the UE 100-1 transmits information on the candidate MR (herein, the MR 200-2) to which handover is made (candidate handover destination information) to the MR 200-1. The candidate handover destination information includes ESSID that is identification information of the MR 200-2 serving as the candidate handover destination.

The control unit 220 in the MR 200-1 receives the candidate handover destination information from the UE 100-1 (candidate handover destination information of the UE 100-1). Next, the control unit 220 in the MR 200-1 transmits the candidate handover destination information of the UE 100-1 to the upper node 400, via the radio base station 300-1.

The control unit 420 in the upper node 400 receives the candidate handover destination information of the UE 100-1. Next, the control unit 420 in the upper node 400 determines, as a handover destination of the UE 100-1, the MR 200-2 corresponding to the identification information included in the candidate handover destination information from the UE 100-1. Then, the control unit 420 in the upper node 400 transmits handover command information to the MR 200-1, via the radio base station 300-1.

The handover command information includes ESSID that is identification information of the MR 200-1 serving as the handover destination of the UE 100-1.

The control unit 220 in the MR 200-1 receives the handover command information. Next, the control unit 220 in the MR 200-1 transmits the handover command information to the UE 100-1.

The control unit 120 in the UE 100-1 receives the handover command information. Next, the control unit 120 in the UE 100-1 searches for the adjacent MR list information of the MR 200-1 by using the ESSID of the MR 200-2 included in the handover command information as a key, and acquires access information of the MR 200-2. Furthermore, the control unit 120 in the UE 100-1 performs a process (a handover) for connecting to the MR 200-2 by using the authentication scheme and authentication key in the acquired access information.

The control unit 120 in the UE 100-1 transmits information indicating that the handover is completed (handover response information) to the MR 200-1. The control unit 220 in the MR 200-1 receives the handover response information. Furthermore, the control unit 220 in the MR 200-1 transmits the handover response information to the upper node 400, via the radio base station 300-1. The control unit 420 in the upper node 400 receives the handover response information. By receiving the handover response information, the control unit 420 in the upper node 400 recognizes that the UE 100-1 has completed the handover from the MR 200-1 to the MR 200-2 in response to the handover command information.

(2) Operation of Radio Communication System

Figure 8:
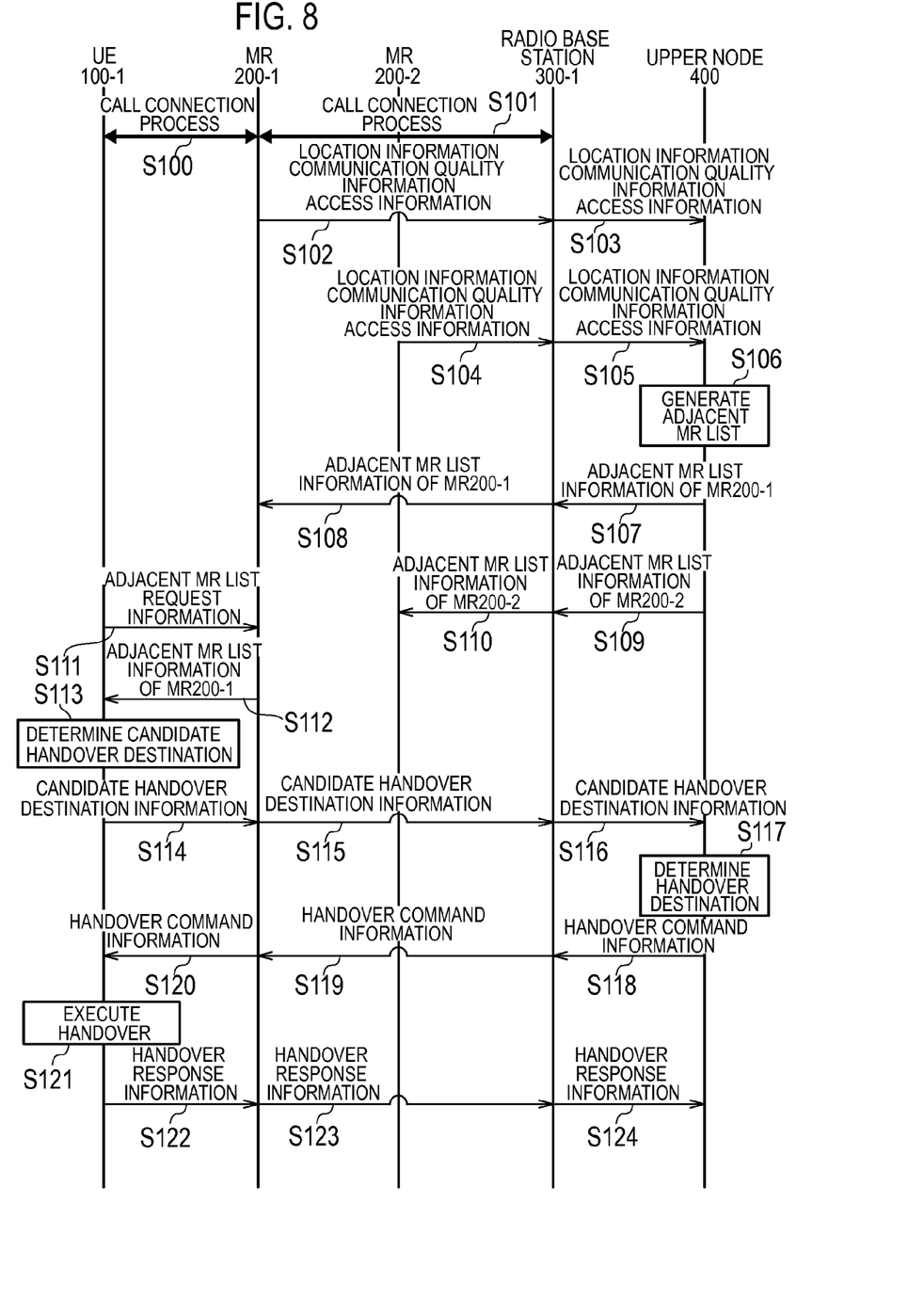
FIG. 8 is a sequence diagram illustrating an operation of the radio communication system according to the embodiment of the present invention.

FIG. 8 is a sequence diagram illustrating an operation of the radio communication system.

In step S100, the UE 100-1 carried by the user 600-1 performs a call connection process with the MR 200-1 carried by the user 600-1.

In step S101, the MR 200-1 determines the radio base station 300-1 as a connection destination, and performs a call connection process with the radio base station 300-1.

In step S102, the MR 200-1 transmits the location information, the communication quality information, and the access information of the MR 200-1 to the radio base station 300-1. The radio base station 300-1 receives the location information, the communication quality information, and the access information of the MR 200-1.

In step S103, the radio base station 300-1 transmits the location information, the communication quality information, and the access information of the MR 200-1 to the upper node 400. The upper node 400 receives the location information, the communication quality information, and the access information of the MR 200-1.

In step S104, the MR 200-2 transmits the location information, the communication quality information, and the access information of the MR 200-2 to the radio base station 300-1. The radio base station 300-1 receives the location information, the communication quality information, and the access information of the MR 200-2.

In step S105, the radio base station 300-1 transmits the location information, the communication quality information, and the access information of the MR 200-2 to the upper node 400. The upper node 400 receives the location information, the communication quality information, and the access information of the MR 200-2.

In step S106, the upper node 400 generates adjacent MR list information of the MR 200-1 and adjacent MR list information of the MR 200-2.

In step S107, the upper node 400 transmits the adjacent MR list information of the MR 200-1. The radio base station 300-1 receives the adjacent MR list information of the MR 200-1.

In step S108, the radio base station 300-1 transmits the adjacent MR list information of the MR 200-1. The MR 200-1 receives the adjacent MR list information of the MR 200-1.

In step S109, the upper node 400 transmits the adjacent MR list information of the MR 200-2. The radio base station 300-1 receives the adjacent MR list information of the MR 200-2.

In step S110, the radio base station 300-1 transmits the adjacent MR list information of the MR 200-2. The MR 200-2 receives the adjacent MR list information of the MR 200-2.

In step S111, the UE 100-1 transmits adjacent MR list request information. The MR 200-1 receives the adjacent MR list request information.

In step S112, the MR 200-1 transmits the adjacent MR list information of the MR 200-1. The UE 100-1 receives the adjacent MR list information of the MR 200-1.

In step S113, the UE 100-1 determines an MR (herein, the MR 200-2) to be a candidate handover destination on the basis of the adjacent MR list information of the MR 200-1.

In step S114, the UE 100-1 transmits candidate handover destination information. The MR 200-1 receives the candidate handover destination information. In step S115, the MR 200-1 transmits the candidate handover destination information. The radio base station 300-1 receives the candidate handover destination information. In step S116, the radio base station 300-1 transmits the candidate handover destination information. The upper node 400 receives the candidate handover destination information.

In step S117, the upper node 400 determines the MR 200-2 as a handover destination of the UE 100-1.

In step S118, the upper node 400 transmits handover command information. The radio base station 300-1 receives the handover command information. In step S119, the radio base station 300-1 transmits the handover command information. The MR 200-1 receives the handover command information. In step S120, the MR 200-1 transmits the handover command information. The UE 100-1 receives the handover command information.

In step S121, the UE 100-1 performs handover from the MR 200-1 to the MR 200-2 on the basis of the handover command information.

In step S122, the UE 100-1 transmits handover response information. The MR 200-1 receives the handover response information. In step S123, the MR 200-1 transmits the handover response information. The radio base station 300-1 receives the handover response information. In step S124, the radio base station 300-1 transmits the handover response information. The upper node 400 receives the handover response information.

As described above, in the radio communication system 1 of the present embodiment, each MR 200 that relays radio communication between the UE 100 and the radio base station 300 transmits the location information of the MR 200, the communication quality information in radio communication between the MR 200 and the radio base station 300, and the access information required when the UE 100 connects to the MR 200, to the upper node 400. The upper node 400 distinguishes another MR 200 existing within a predetermined range from one MR 200 on the basis of the location information from each MR 200. Furthermore, the upper node 400 generates adjacent MR list information indicating order concerning a connection between one MR 200 and another MR 200 existing within the predetermined range from the one MR 200 on the basis of the communication quality information from each MR 200, and transmits the adjacent MR list information to the UE 100 connecting to the one MR 200. The UE 100-1 performs handover from the one MR 200 to the other MR 200 on the basis of the adjacent MR list information.

Therefore, the UE 100 is capable of preferentially connecting to the MR 200 performing communication in a good state with the radio base station 300 among the plurality of MRs 200 existing within the predetermined range. Furthermore, the adjacent MR list information includes access information of each MR 200. Therefore, a plurality of UEs 100 are capable of connecting to one MR 200, thereby efficiently performing radio communication.

(3) Other Embodiments

Thus, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

In the aforementioned embodiment, as illustrated in FIG. 1, the explanation is provided for a case where both the MR 200-1 and the MR 200-2 connect to the radio base station 300-1. However, the present invention can also be applied in the same manner to a case where the MR 200-1 connects to the radio base station 300-1 and the MR 200-2 connects to the radio base station 300-2.

In this case, the MR 200-2 transmits the location information, the communication quality information, and the access information of the MR 200-2 to the upper node 400, via the radio base station 300-2. Furthermore, the upper node 400 transmits the adjacent MR list information of the MR 200-2 to the MR 200-2, via the radio base station 300-2.

Thus, even when the MR 200-1 and MR 200-2 connects to respective different radio base stations 300, the UE 100 is capable of preferentially connecting to the MR 200 performing communication in a good state with the radio base station 300 among the plurality of MRs 200 existing within the predetermined range. Furthermore, the adjacent MR list information includes the access information of each MR 200. Therefore, the plurality of UEs 100 are capable of connecting to one MR 200, thereby efficiently performing radio communication.

In addition, in the aforementioned embodiment, the explanation is provided for a case where the radio communication system 1 includes two MRs 200 and two radio base stations 300. However, the present invention can also be applied in the same manner to a case where the radio communication system 1 includes at least three MRs 200 and at least three radio base stations 300.

Moreover, in the aforementioned embodiment, the explanation is provided for a case where the relay device is the mobile router (MR). However, the present invention can also be applied in the same manner to a case where the relay device is a relay device which is other than the mobile router and which has a function of relaying radio communication between the UE 100 and the radio base station 300.

In the aforementioned embodiment, the explanation is provided for a case of the bus. However, the present invention is not limited to a case of the bus.

In the present invention, the relay devices may generate communication quality information in radio communication between the relay devices and the radio base station, and the terminal device may preferentially connect, without passing through the upper node, to the relay device having the best communication quality based on each of the communication quality information.

Thus, it should be understood that the present invention includes various embodiments that are not described herein.

In addition, the entire contents of Japanese Patent Application No. 2011-116275 (filed on May 24, 2011) are incorporated in the present specification by reference.

INDUSTRIAL APPLICABILITY

According to the characteristics of the present invention, it is possible to efficiently perform radio communication in a good state.

The invention claimed is:

1. A radio communication system comprising: a radio base station, a terminal device, a plurality of relay devices that relay radio communication between the radio base station and the terminal device, and an upper node, wherein
   each of the plurality of relay devices notifies communication quality information indicating radio communication quality between a corresponding relay device and the radio base station, to the upper node,
   the upper node distinguishes the plurality of relay devices existing within a predetermined range on the basis of location information of the plurality of relay devices, and notifies the terminal device of order information that is the information obtained by ordering, on the basis of the communication quality information, the plurality of relay devices existing within the predetermined range, and
   the terminal device preferentially connects to a relay device among the plurality of relay devices at the highest order indicated by the order information.

2. The radio communication system according to claim 1, comprising:

an upper node, wherein
the plurality of relay devices notifies the upper node of the communication quality information in radio communication between the relay devices and the radio base station,
the upper node notifies the terminal device of the communication quality information, and
the terminal device preferentially connects to the relay device having the best communication quality based on each of the communication quality information.

3. The radio communication system according to claim 2, wherein
the upper node notifies the terminal device of order information that is information obtained by ordering the plurality of relay devices on the basis of the communication quality information, and
the terminal device preferentially connects to the relay device at the highest order indicated by the order information.

4. A communication control method in the radio communication system including: a radio base station, a terminal device, a plurality of relay devices that relay radio communication between the radio base station and the terminal device, and an upper node, the method comprising:

notifying, by each of the plurality of relay devices, communication quality information indicating radio communication quality between a corresponding relay device and the radio base station, to the upper node,
distinguishing, by the upper node, the plurality of relay devices existing within a predetermined range on the basis of location information of the plurality of relay devices,
notifying, by the upper node, order information that is the information obtained by ordering, on the basis of the communication quality information, the plurality of relay devices existing within the predetermined range, to the terminal device, and
preferentially connecting, by the terminal device, to a relay device among the plurality of relay devices at the highest order indicated by the order information.

\* \* \* \* \*